United States Patent [19]

Coué

[11] Patent Number: 4,543,078
[45] Date of Patent: Sep. 24, 1985

[54] PEDAL CRANK DERAILLEUR FOR A BICYCLE

[75] Inventor: Maurice E. L. Coué, Feucherolles, France

[73] Assignee: Huret et ses Fils, Nanterre, France

[21] Appl. No.: 529,882

[22] Filed: Sep. 6, 1983

[30] Foreign Application Priority Data

Sep. 15, 1982 [FR] France ............... 82 15595

[51] Int. Cl.[4] ............................................. F16H 9/00
[52] U.S. Cl. .................................................. 474/82
[58] Field of Search ................................ 474/80, 82

[56] References Cited

U.S. PATENT DOCUMENTS 3,890,847 6/1975 Dian .
4,362,523 12/1982 Huret .................. 474/82

FOREIGN PATENT DOCUMENTS 855077 1/1943 France .
1026010 1/1953 France .
78/25377 9/1978 France .

Primary Examiner—James A. Leppink
Assistant Examiner—Frank H. McKenzie, Jr.
Attorney, Agent, or Firm—Trexler, Bushnell & Wolters

[57] ABSTRACT

A fork element 1 for guiding the chain is pivotally mounted by means of a deformable parallelogram structure 11, 12 on a support constituted by an arm 3 which is upwardly and outwardly inclined relative to a vertical plane containing the longitudinal axis of the bicycle. The parallelogram structure is deformed in a plane which is inclined in a direction parallel to said arm. With this arrangement, the fork element is shifted in a constant vertical position in a combined oblique upward and advancing movement so as to shift the chain from a small chain wheel to a larger chain wheel.

3 Claims, 4 Drawing Figures

4,543,078

PEDAL CRANK DERAILLEUR FOR A BICYCLE

DESCRIPTION

The present invention relates to derailleurs employed on cycle chains and in particular a chain derailleur for a pedal crank chain wheel.

It is known that a pedal crank derailleur usually comprises a fork element for guiding and shifting the chain, this element being pivotally mounted on a support adapted to be fixed to the frame of the bicycle.

Usually, this fork element is pivotally mounted to a support by means of two parallel links so that the assembly constitutes a parallelogram structure for shifting the fork element in a direction roughly transversely of the chain.

In certain derailleur mechanisms, the fork element is adapted to move also obliquely relative to the chain.

In the case of the pedal crank derailleur, the passage of the chain from the small chain wheel to the large chain wheel can present difficulties owing to the difference between the diameters of the wheels, which is usually larger than the differences of diameter between the sprockets of the rear bicycle wheel, since the chain must be shifted radially relative to the chain wheels on a relatively large distance.

An object of the invention is to provide a pivot device for the fork element of a pedal crank derailleur on its support adapted to facilitate the raising of the chain from one chain wheel to a larger chain wheel.

The invention therefore provides a pedal crank derailleur for a bicycle comprising a fork element for guiding and shifting the chain from one chain wheel to another, said fork element being mounted by means of a deformable mechanism on a support fixed to the frame of the bicycle, wherein said fork element is shifted obliquely relative to the chain, said derailleur comprising means for shifting the fork element in translation in a combined upward and forward movement when the derailleur is actuated for shifting the chain from a chain wheel to a larger chain wheel.

According to another feature of the invention, the mechanism is an articulated parallelogram structure and said means for shifting the fork element comprise at least one oblique arm connected to the support and inclined upwardly and outwardly relative to a vertical plane containing the longitudinal axis of the bicycle, on which there are pivotally mounted two links constituting said parallelogram structure with the arm and the fork element so that said links pivot in a plane which is also inclined in a direction parallel to said arm.

Preferably, in a derailleur for more than two chain wheels, said arm is also inclined forwardly so as to allow a sufficient travel for the fork element.

Further features and advantages of the invention will be apparent from the following description which is given solely by way of example with reference to the accompanying drawings in which.

Figure 1:
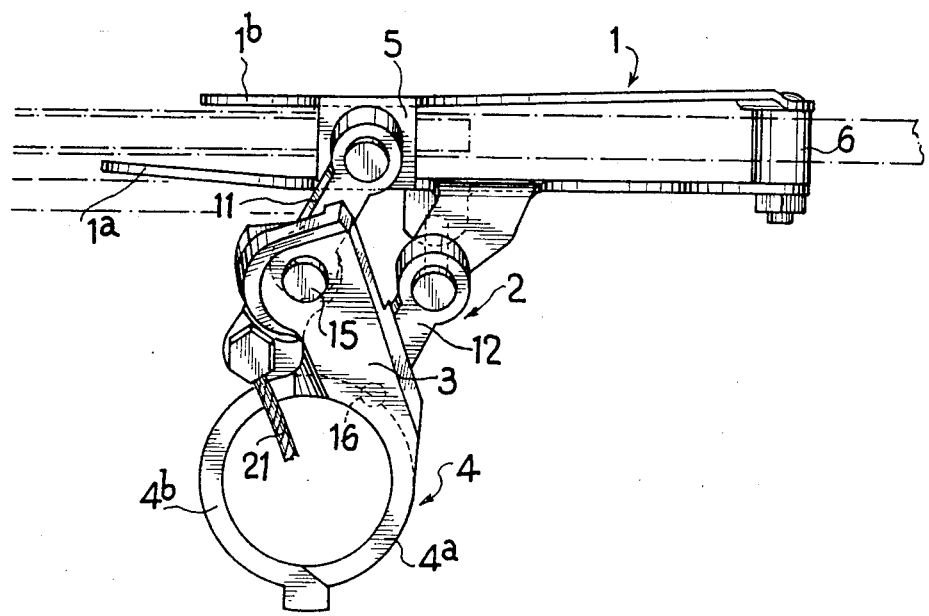
FIG. 1 is a top plan view of the support arm and the fork element pivotally mounted on the latter, the fork element being in an upper advanced position above the large chain wheel of the pedal crank.

With reference to the drawings, the pedal crank derailleur comprises a fork element 1 for guiding and shifting the chain C, this element being pivotally mounted by means of an articulation device generally indicated by the reference numeral 2, on an arm 3 rigid with a support 4.

The fork element 1 comprises in the known manner two wings 1a, 1b, the inner wing 1a having a length slightly greater than the outer wing 1b and the wings being interconnected by an intermediate portion 5 and by a spacer member 6 which interconnects the rear ends of the wings 1a, 1b.

The wings 1a, 1b of the fork element extend roughly vertically downwardly on each side of the chain C.

The intermediate portion 5 of the fork element has an inclined planar surface and is provided with an aperture 7 and the wing 1a has a folded tab 8 which is inclined relative to the wing 1a at the same angle as the intermediate portion 5. A second tab line is cut out from the wing 1a and folded at the same angle as the tab 8, the tabs 8 and 9 being each provided with an aperture 10 which are in alignment with each other.

The fork element 1 is pivotally mounted on the arm 3 by means of the articulation device 2 which is formed in the known manner by a deformable parallelogram structure.

Two opposed sides of this parallelogram structure are formed by two links 11, 12, one end of the link 11 being pivotally mounted by means of a pin 13 in the aperture 7 of the intermediate portion 5 and the link 12 being pivotally mounted at one end by means of a pin 14 in the apertures 10 of the tabs 8 and 9. The two links are parallel to each other and to the surfaces of the intermediate portion 5 and the tab 8 and their ends opposed to the fork element are pivotally mounted by means of pins 15, 16 respectively on the arm 3, on the surfaces of the latter which are also inclined relative to the wings of the fork element.

According to the illustrated embodiment and owing to the shape of the element 1 in which the surface of the intermediate portion 5 and the surface of the tab 8 are offset, the links 11 and 12 are pivotally mounted on stepped surfaces of the lower side of the tab 3.

Preferably, a return spring 17 surrounds the pivot pin 14 of the link 12 on the fork element 1 between the tabs 8 and 9 of the latter, one of the ends of the spring 17 being fastened in the tab 9 while its opposite end bears against an extension 18 of the pivot pin 16, the spring being pre-stressed in such manner as to return the fork element resiliently in the known manner.

The two other opposed sides of the parallelogram structure are formed, on one hand, by the fork element 1 and, on the other hand, by the arm 3.

The arm 3 is at the end thereof opposed to the fork element rigid with a suitable support 4 adapted to be fixed to a frame tube of a bicycle, this support being formed in the illustrated embodiment by two semi-circular parts 4a, 4b which are pivotally interconnected and may be clamped around the tube in the known manner.

It will be understood that, owing to the inclination of the intermediate portion 5 and of the tabs 8 and 9 of the fork element and to the inclination of the arm 3, the parallelogram structure is deformable in a plane which is also inclined and extends obliquely from the frame, upwardly and toward the fork element, i.e. outwardly of the bicycle relative to a vertical plane containing the longitudinal axis of the bicycle.

Means are provided for deforming the parallelogram structure in its plane and for actuating the derailleur. These means comprise, for example, an extension 19 of the link 11 beyond the pin 15 and carrying means 20 for securing a flexible cable 21 of the Bowden type connected to a derailleur control lever (not shown).

Figure 2:
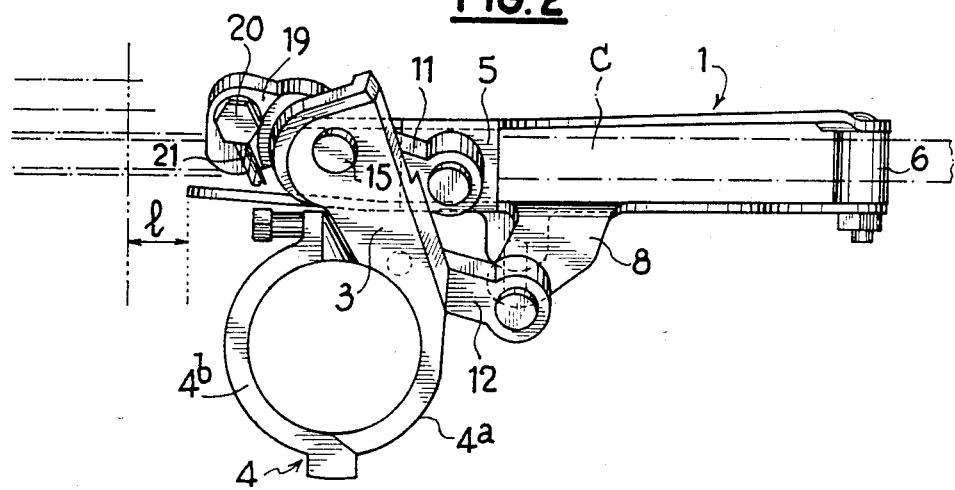
FIG. 2 is a view similar to that of FIG. 1 in which the fork element is shown in a lower retracted position above the small chain wheel of a pedal crank having two chain wheels.
Figure 4:
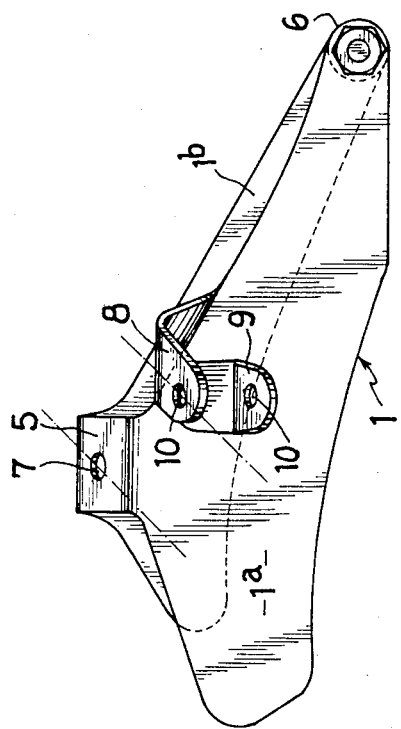
FIG. 4 is a side elevational view of the fork element showing the pivotal mounting means of the links.
Figure 3:
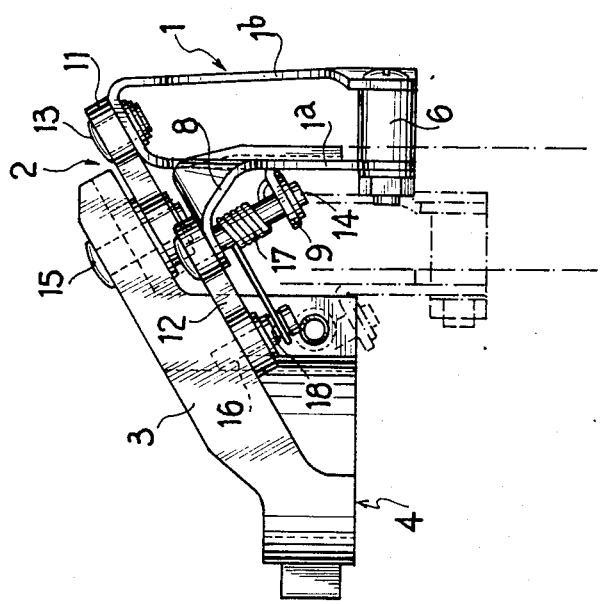
FIG. 3 is a rear elevational view of the support and of the fork element, showing the upper and lower positions of the later.

When the lever is shifted, the cable 21 pivots the link 11 which drives the link 12 and, owing to the geometry of the articulation device, the fork element 1 is shifted between an advanced upper position shown in full lines in FIG. 3, and a lower retracted position shown in dotted lines in FIG. 3. The movement of the fork element results from the position of the deformable parallelogram structure 2, and the difference between the two positions of the fork element appears from the comparison of FIGS. 1 and 2 and is represented by the reference letter l shown in FIG. 2.

Owing to this arrangement, it will be understood that when the user desires to shift the chain C from its position on the small chain wheel (FIG. 2) onto the large chain wheel (FIG. 1), the inner wing 1a of the fork element shifts the chain laterally and obliquely in a rising motion while it accompanies the chain in its forward movement through the distance l. This considerably facilitates the passage of the chain from the small chain wheel onto the large chain wheel.

It will be observed, with reference to FIGS. 1 and 2, that the axis of the arm 3 is also inclined forwardly relative to the vertical plane containing the longitudinal axis of the bicycle in the direction of the front end of the fork element. The object of this inclination is to allow a larger travel of the links in the case where the derailleur is employed on a bicycle having more than two pedal crank chain wheels.

However, it will be understood that the arm 3 may also extend on the support 4 in a direction perpendicular to the wings of the fork element, the essential arrangement being to ensure that it is inclined outwardly and upwardly.

It will be understood that modifications may be made in this embodiment. In particular, an articulation mechanism equivalent to the parallelogram stucture may be provided, in which one of the links is eliminated and replaced by a finger member guided in a slot or by a cam having a suitable profile, for example as disclosed in French patent No. 81 11 972.

Having now described my invention what I claim as new and desire to secure by Letters Patent is:

1. A pedal crank chain wheel derailleur for a bicycle having a chain, said derailleur comprising a fork element for guiding and shifting the chain relative to the pedal crank chain wheel, a support having a longitudinal axis and for fixing to a frame of the bicycle, a deformable parallelogram mechanism having four links relatively pivotable in fixed planes which are inclined upwardly and laterally from a verticle plane containing said longitudinal axis of said support and also containing a longitudinal axis of the bicycle when the support is mounted on said frame, said mechanism mounting the fork element on the support, means for shifting the fork element in translation relative to said support in such direction that the fork element effects a combined rising and advancing movement solely due to the action of said links when the derailleur is actuated for shifting the chain from a first chain wheel to a second chain wheel, which second chain wheel has a larger diameter than the first chain wheel.

2. A pedal crank chain wheel derailleur for a bycycle having a chain, said derailleur comprising a fork element for guiding and shifting the chain, a support for fixing to a frame of the bicycle, a deformable parallelogram mechanism mounting the fork element on the support, means for shifting the fork element in translation in a combined rising and advancing movement when the derailleur is actuated for shifting the chain from a first chain wheel to a second chain wheel having a larger diameter than the first chain wheel, said shifting means comprising at least one oblique arm rigid with the support and inclined upwardly and outwardly relative to a vertical plane containing a longitudinal axis of the support and a longitudinal axis of the bicycle when the support is mounted on said frame, two links pivotally mounted on the arm and constituting said parallelogram mechanism with the arm and the fork element so that said links pivot in a plane which is also inclined and parallel to the arm.

3. A derailleur according to claim 2, wherein the arm is also inclined forwardly relative to said vertical plane.

* * * * *